July 3, 1962  H. KRAMER  3,042,113
WEB-TO-TUBE FASTENINGS
Filed Nov. 12, 1959  2 Sheets-Sheet 1

INVENTOR.
HYMAN KRAMER
BY
ATTORNEY

July 3, 1962  H. KRAMER  3,042,113
WEB-TO-TUBE FASTENINGS
Filed Nov. 12, 1959  2 Sheets-Sheet 2
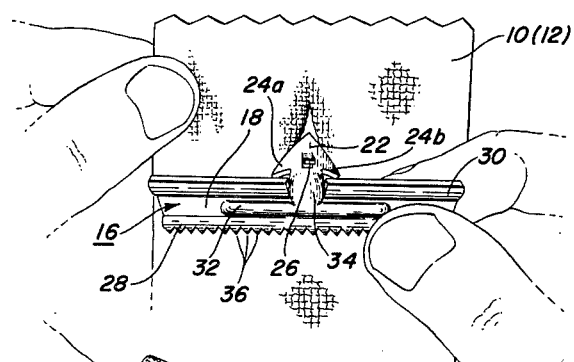
FIG. 7
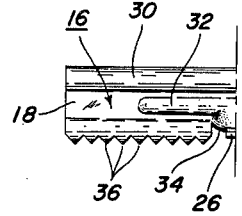
FIG. 3A
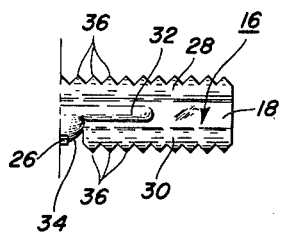
FIG. 3B
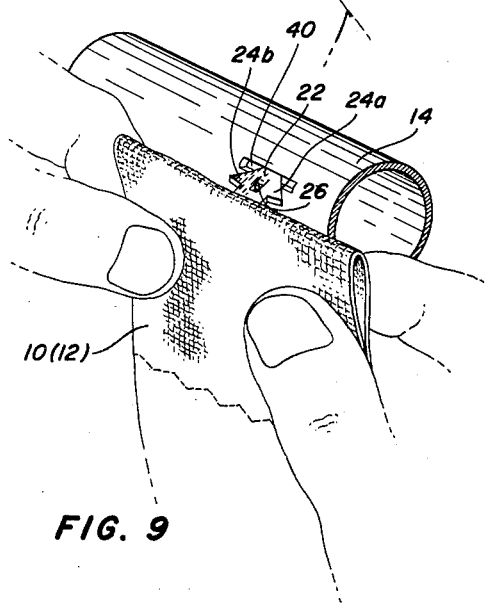
FIG. 8
FIG. 9
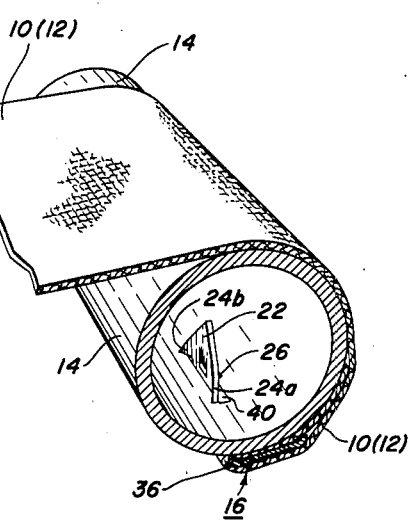
FIG. 10
INVENTOR.
HYMAN KRAMER
BY
ATTORNEY Patented July 3, 1962

3,042,113
WEB-TO-TUBE FASTENINGS
Hyman Kramer, 2764 E. 16th St., Brooklyn, N.Y.
Filed Nov. 12, 1959, Ser. No. 852,320
16 Claims. (Cl. 160—404)

This invention relates to improvements in the web-to-tube fastenings and to an improved fastener clip for use in such a fastening.

More particularly, the invention is directed to a fastening for securing the ends of fabrics and/or plastic webbing strips now widely used in making up the seat and/or back portions of tubular-frame furniture to the tubular framing thereof (which, for convenience, is hereinafter called "tubing"), and to an improved fastener clip therefor, the present application being a continuation-in-part of my earlier applications Serial No. 763,951, filed September 29, 1958, now Patent No. 2,979,119, dated April 11, 1961, and Serial No. 784,280, filed December 31, 1958, which are directed to a generally similar fastening and fasteners therefor.

A primary object of the present invention is the provision of an effective webbing strip-to-tubing fastening of the stated character having a neat, finished appearance, and of an improved fastener clip for use in such a fastening, wherein both the fastening and fastener clip are ideally suited to most tubing shapes, sizes and tubing-wall thicknesses, and to substantially all webbing strip construction and widths now on the market.

Another important object of the invention is the provision of an improved, highly effective T-form fastener clip for use as aforesaid and which possesses the numerous advantages of such a fastener clip as explained in my prior applications aforesaid, and particularly said application Serial No. 784,280.

A further and more practical object of the invention is the provision of an improved T-clip form of fastener for use as aforesaid, whose design and construction are such that it may be stamped from flat sheet stock and thereon formed to its final T-shape in exceedingly simple manner, as permits fastener clips according to the invention to be produced in quantity at a low unit cost.

Another object of the invention is the provision of a T-clip form of fastener for use as aforesaid, whose design and construction are such as permits its ready assembly both to the webbing-strip end tubing components of the fastening.

Still another object of the invention is the provision of a T-clip type of webbing-strip end to tubing fastener which is capable of being assembled to its webbing strip end and tubing with a simple push-in operation, yet whose construction is such that it cannot accidentially fall out or become dislodged from either following its assembly therewith.

Another more specific object of the invention is the provision of an improved T-form fastener clip as aforesaid characterized in that the vertical leg part of the T terminates in a point which is so shaped as not only to facilitate entry of the shank through the webbing end and thereupon into the tubing opening provided therefor, but also to self-lock itself when so inserted to each of the webbing strip and tubing.

Yet another object of the invention is the provision of an improved T-form fastener clip as aforesaid, in which the vertical leg part of the T terminates in an arrow-headed point which enables its assembly to the webbing strip end which it is to secure as by simply pushing said point through the material of the webbing strip for the more difficult-to-penetrate material or through but a small starting hole provided therefor in the webbing strip as is adequate to initiate penetrating movement of the point.

The above and other objects and improvement features of the webbing strip-to-tubing fastening and a fastener clip therefor according to the present invention will appear from the following detailed description and accompanying illustrative drawings, wherein:

FIGS. 3A and 3B are left- and right-half top views of a fastener clip corresponding generally to that shown in FIGS. 3 and 4 which, when taken with said latter figures, illustrate that the webbing-strip gripping teeth may be applied to either one or both of the longitudinal edges of the clip head part.

FIGS. 7, 8 and 9 are schematic views illustrating the three major steps practiced in carrying out one of the various possible procedures of assembling a fastener clip of the invention first to a webbing strip end and thereafter, with webbing-strip end related thereto, to the furniture tubing; and FIG. 10 is a sectional, broken-away perspective view of the completed fastening and fastener clip of the invention.

Figure 1:
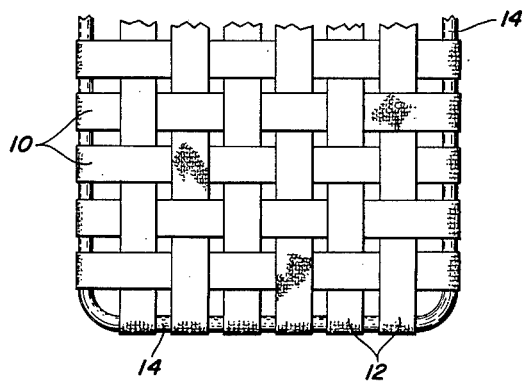
FIG. 1 is a fragmentary view of a seat (or back) of a piece of tubular-frame furniture fashioned from interlaced fabric or plastic webbing strips extending crosswise between and secured at their ends to the spaced tubular framing (tubing) thereof as by a plurality of the fastener clips of the present invention.

Referring to the drawings in detail, FIG. 1 illustrates the application of the present invention to the construction of the seat (or back) of a piece of tubular-frame furniture which is made up of interlaced webbing strips 10, 12 of fabric or plastic material fastened at their opposite ends to spaced tubing parts 14 constituting the frame of the particular piece of furniture, it being understood that the invention is directed to an improved webbing strip end-to-tubing fastening of neat, finished appearance, and to an improved T-form fastener clip for use therewith which is characterized by simplified design and inexpensive construction, which may be assembled both easily and speedily first to the webbing-strip end and thereafter to the tubing, and which possesses high fastening power as compared to webbing-strip end fasteners now in use.

Figure 3:
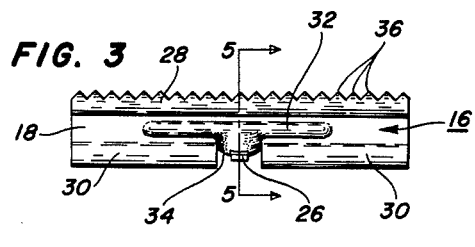
FIGS. 3 and 4 are top and end views of a finally formed fastener clip according to the invention.
Figure 5:
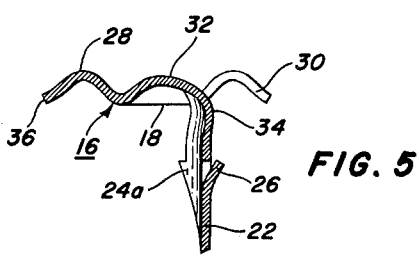
FIG. 5 is a section taken along line 5—5 of FIG. 3 to illustrate the preferred profile of the vertical leg and its arrow-headed point of said fastener clip, with FIG. 5A showing a slight modification of the clip head part.
Figure 4:
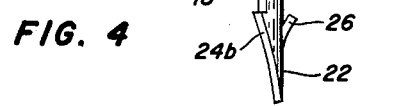
Figure 6:
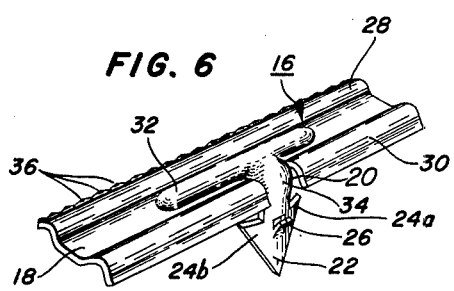
FIG. 6 is an enlarged perspective view further illustrating the structural and appearance details of the improved fastener clip as herein proposed.

As seen in FIG. 6, a fastener clip 16 according to the invention is characterized by generally T-shaped configuration when viewed from both front and ends. More particularly, it comprises a relatively elongated cross-head part 18 and an integral vertical leg part generally designated 20 depending from the longitudinal mid portion thereof and including a shank terminating at its lower or free end in a point 22 having arrowhead configuration. Both the head part and the leg with its pointed end have appreciable width and, as seen in FIGS. 3 and 6, at least the lower length portion of the leg and its pointed end preferably have concavo-convex section throughout their vertical length. Accordingly, the side flukes or barbs 24a, 24b of the arrowheaded point are displaced somewhat to one side of the general plane of the leg and point, as is best illustrated in FIG. 5, for example, it being here observed that said general plane is coplanar or substantially so with the plane containing the longitudinal center line of the fastener head part 18.

As further seen in FIGS. 5 and 6, a springy locking lug 26, also referred to in the trade as a louver, is struck out from the convex face of the leg in such manner that the free upper end thereof defines an upwardly facing shoulder which is disposed to the opposite side of the locking point from the aforesaid barbs or flukes 24a, 24b whose upper edges may also be said to provide springy, upwardly facing shoulders. The louver or lug 26 and said flukes have substantially the same elevation as spaces them from the under face of the fastener clip head-part 18 a distance which is slightly greater than the wall thickness of the tubing to which the fastener clip is to be assembled.

Figure 2:
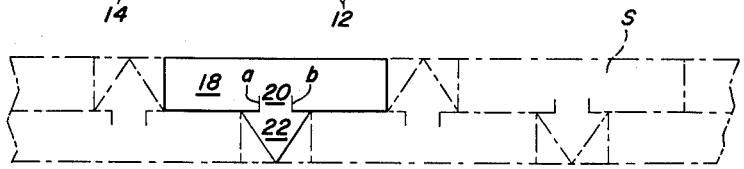
FIG. 2 is a plan view illustrative of the blank from which an individual fastener clip of the invention is fashioned, and in broken lines a preferred procedure or blanking out the fastener clips in quantity from a strip of appropriate fastener-forming material such as coiled sheet metal.

Preferably, fastener clips 16 of the invention are blanked out from sheet stock such as an appropriate sheet metal in the form of a longitudinally extending strip S (FIG. 2), usually drawn from a coil thereof, and the vertical shank-forming portion of each blank is struck out from a longitudinally central, side edge portion of its head-forming portion, as indicated by lines of cut a, b, whereas the portion of the clip blank which ultimately forms the arrowheaded point 22 is blanked out from strip material lying outside of the rectangle of said head portion. To produce the fastener-clip blanks in quantity with a minimum of scrap, said blanks are preferably fashioned from strip stock having double the width required to make a single fastener clip, and individual fastener blanks disposed in staggered, oppositely facing relation are stamped therefrom as diagrammatically illustrated in FIG. 2, thus yielding two clip blanks per single width of strip.

Figure 5A:
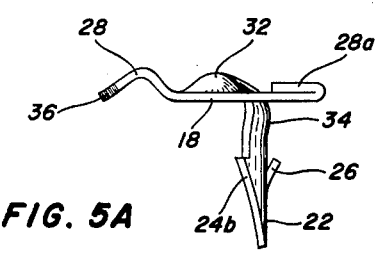

Upon the individual fastener-clip blanks being produced as aforesaid, they are acted upon in a suitable die which effects bending of the leg 20 and its arrow-pointed end 22 downwardly or at a right angle from the head or top portion 18 of the blank, as imparts the aforesaid T-configuration to the fastener clip as a whole, and also effects convexing of said leg and point and forming of the lug or louver 26. Due to the fact that the vertical leg part 20 of the fastener clip is struck from the side-edge material of the head part 18 as aforesaid, the line of bend of said leg and point with respect to said head part is of course set back appreciably from said longitudinal side edge, i.e. to about the longitudinal center line of said head part. By providing the head part with appropriate width as shown, this cutting-out of the leg part 20 from a side edge portion thereof does not materially weaken same, but it is preferred that said head part be stiffened by forming therein upwardly convex edge ribs 28, 30, extending the full length of said head part and disposed closely adjacent the side edges thereof, and also a central, shorter length, upwardly convex rib 32, from which, in effect, the vertical leg 20 and its arrowheaded point depend. If desired or considered necessary, the relatively front edge 28a of the head part 18 from which the leg part 20 is cut may be curled or rolled over as shown in FIG. 5A, thus to provide stiffening thereto. Said vertical leg and its pointed end are also preferably stiffened as by a forwardly protruding reinforcing bulge 34 formed in the zone of the leg lying adjacent its line of connection with the head part 18. This bulging is preferably in supplement to the forward vertical convexity imparted to the leg and point as earlier described.

According to yet another preferred feature of the invention, at least one side edge of the fastener head part is serrated so as to form a longitudinal series of downwardly acting webbing-strip gripping teeth 36. Illustratively, these teeth are formed on the continuous edge of the fastener head, i.e. the edge opposite that from which the vertical leg part 20 and its arrowheaded point 22 depend, but by reference to FIGS. 3A and 3B it is within the purview of the invention to serrate said opposite edge (3A), or even both edges (3B), of the fastener head so as to provide same with gripping teeth as aforesaid.

The overall dimensions of the fastener clip as aforesaid will of course depend on its particular use. In general, however, its length will be slightly less than the width of the webbing strip to which the fastener clip is to be assembled, and it will have the requisite width as insures against thec lip head part 20 bending along its transverse center line under heavy pull consequent to its vertical leg 22 being struck from the side edge material of the central portion of said head part.

Referring to FIGS. 7, 8 and 9, which illustrate the manner of hand-assembling a fastener clip as described to a webbing-strip end to be fastened thereby, and thereupon of assembling the webbing-strip end with fastener clip related thereto to the aforesaid tubing 14 referred to in connection with FIG. 1, the fastener clip is first assembled to the webbing-strip end portion generally as shown in FIG. 7; that is to say, with the fastener clip held with its interrupted head-part edge and consequently the convex face of the leg part and its arrowhead-shaped point turned toward the free end of the webbing strip, it is moved against the webbing strip at a mid point thereof which is set back at least three-quarters of an inch (¾") from its free or terminal end edge, as provides a free end or tail portion of the webbing strip which extends beyond the fastener clip. Because of the facility with which the arrow-pointed end 22 of the fastener-clip leg will pierce most webbing strip materials, it is not usually necessary to pre-cut an opening in the webbing-strip end for the reception of a clip point. However, should an opening be required by virtue of the particular construction or nature of the material of the webbing strip, a small opening only will be found adequate, since the action of the clip point is to work itself through even a small opening. When such has been effected, the flukes or barbs 24a, 24b of the point, and also the operative edge of louver 26 will engage against the under face of the webbing strip, thus to prevent the fastener clip, when once assembled thereto, from being accidentally or unintentionally shaken loose from said webbing strip.

As seen in FIG. 8, the free-end or tail portion of the webbing strip extending beyond the fastener clip is then folded upwardly-rearwardly over the latter, and also the fastener clip is turned 180° within the fold, with the result that, rather than its point 22 facing away from the person making the fastening, it now faces said person, and said turning operation also causes the webbing strip end to fold relatively upwardly-rearwardly on itself about a line of fold defined by the non-interrupted side edge of the clip head-part 18.

The webbing-strip end, with fastener clip attached, is now ready to be assembled to the tubing 14, which, as seen in FIGS. 9 and 10, is provided in its wall portion with an appropriately shaped opening, illustratively an elongated, parallel-sided hole or slot 40, for the reception of the fastener-clip leg and point. Assuming that the tubing is disposed with said slot 40 facing the operator, as in FIG. 9, the operator turns the webbing strip 180° about its longitudinal axis relative to its FIG. 8 position, thus to present the fastener point to the slot. By a straight push-in movement, the pointed shank 20, 22 of the fastener clip moves into the slot 40 to a depth such that the barbs 24a, 24b and the locking shoulder formed by the louver 26 snap under its opposite side edges and then secure themselves to said under edges with a self-locking action. Of course, it is to be understood that the overall thickness of the fastener point 22, consequent to the displacement of the barbs 24a, 24b to one side, and the protrusion of the lug or louver 26 to the other side, of the plane of said point, is initially greater than the width of the tubing slot 40, but that the spring action inherent in the make-up of said barbs and louver enables same to flex towards one another while moving into the slot, and thereupon to spring outwardly upon clearing the slot side edges. When the latter takes place, the working edges of both the barbs and louver engage against the inner surface portions of the wall of the tubing which extend along the opposite slot edges, thus to provide a highly effective locking action.

Referring to FIG. 10, it is possible, by the use of a fastener clip as aforesaid assembled to the webbing strip end in the manner described, to obtain supplementary holding action over and above that provided by the fastener clip per se. For example, by arranging the free end or tail of the webbing strip, i.e. the portion thereof which initially extended beyond the line or point thereof at which the fastener clip was applied and which was brought forwardly over the fastener clip as in FIG. 8, so that it extends as an under-lap relative to and thus in position to be pressed against the peripheral surface of the tubing 14 by the overlying or main portion of the webbing strip which wraps about the tubing, a substantial frictional strip-end holding force is engendered, which of course increases as more weight is placed on the webbing strip, as by a person sitting on the same.

Also to be noted is that, upon completion of the fastening as aforesaid, the edge teeth 36 of the fastener tend to bite into and securely grip the webbing strip with increasing force as weight is applied to the latter. That is to say, should the continuous edge of the clip head 18 be provided with teeth 36 as in FIG. 3 and assuming also assembly as described above in connection with FIGS. 7-9 inclusive, the teeth will bite into and grip the webbing strip material along the line of fold between the overlying-underlying wrap portions of the final fastening shown in FIG. 10. On the other hand, should the interrupted edge of the clip head be provided with the gripping teeth as in FIG. 3A and considering that the herein fastener clip as a whole tends to cock in direction (counter-clockwise direction, FIG. 10) as causes the relatively rearward side edge of its head part to move against the tubing surface when tension is applied to the webbing strip by a person sitting on the same the teeth 36 of said edge bite into and accordingly impart a substantial holddown force on the underlying wrap or tail portion of the fastener webbing strip end, thus adding appreciable holding power to the fastening. Accordingly, in a fastening as described, at least three major holding effects are achieved, which in total insure a highly effective webbing strip-to-tubing securement.

Although manual assembly of a fastener clip to webbing-strip end has been described in the foregoing, it is to be understood that a fastener clip according to the present invention is ideally suited to being assembled to a webbing-strip end by the method disclosed and claimed in my application Serial No. 807,243, filed April 17, 1959.

Without further analysis, it will be appreciated that the above described webbing strip-to-tubing fastening and the improved and highly refined fastener clip for use therewith achieve the objectives of the invention explained in the foregoing. However, various changes can be made in carrying out the above constructions without departing from the scope of the invention, and accordingly it is intended that all matter contained in the above description or shown in the accompanying drawings shall be interpreted as illustrative and not in a limiting sense.

I claim:

1. For use in tubular frame furniture construction having supporting elements comprising strips of webbing extending between and secured at their end portions to spaced frame parts made of tubing, a webbing strip-to-tubing fastener comprising a clip member having general T-configuration in at least front elevation and including an elongated bar-like head part having length corresponding substantially to the length of the webbing strip to be fastened and an integral prong-like vertical leg part consisting of a shank comprising an area which is blanked out from one longitudinally central, side edge portion of the head part and depends substantially at a right angle to the remaining portion of said head part, and extending from said shank an arrowhead-shaped point having laterally extending locking barbs, said leg part lying generally in a plane which is substantially coplanar with that containing the longitudinal center line of the head part, and said barbs being spaced from the under side of the head part an amount corresponding substantially to the thickness of the wall of the tubing and being furthermore displaced from the general plane of the leg part in direction and amount as to render their relatively upper working edges capable of snapping under at least one side edge of an opening provided in said tubing upon the leg part being forcibly inserted in said opening, said barbs also serving initially to secure the fastener to the webbing strip when preassembled thereto.

2. A T-clip type of webbing strip-to-tubing fastener substantially as set forth in claim 1, wherein at least the point of the vertical leg part is substantially concavo-convex in transverse section, whereby the barbs are displaced to one side of the general plane of the leg part.

3. A T-clip type of webbing strip-to-tubing fastener substantially as set forth in claim 1, wherein the locking barbs are displaced to one side of the general plane of said leg part and said point is provided in its body portion with a louver projecting to the other side of said plane and inclining sidewardly-upwardly towards a longitudinal side edge of said head part and terminating in a free upper edge which is spaced from the under side of the head part similarly to the spacing of the locking barbs, thereby providing an upwardly facing locking shoulder capable of snapping under the opposite edge of the tubing opening when the fastener leg part is forcibly inserted therein as aforesaid.

4. A T-clip type of webbing strip-to-tubing fastener substantially as set forth in claim 1, wherein said head part is provided with at least one longitudinally extending stiffening rib and said leg part is substantially concavo-convex in horizontal section as effects stiffening thereof.

5. A T-clip type of webbing strip-to-tubing fastener substantially as set forth in claim 1, wherein said head part is provided with at least one longitudinally extending stiffening rib and at least the point of said leg part is substantially concavo-convex in horizontal section as effects stiffening thereof, and wherein the shank portion of the leg part is provided with a forwardly convex stiffening bulge in its zone immediately adjacent the head part from which it depends.

6. A T-clip type of webbing strip-to-tubing fastener substantially as set forth in claim 1, wherein at least the longitudinal side edge of the head part opposite said side edge portion from which the leg-part shank is blanked out has downwardly-acting webbing-gripping teeth provided therealong.

7. Tubular-frame furniture construction comprising a piece of tubing having an opening provided in its tubular wall and which is defined in part by side edges, a webbing strip end portion associated with said tubing, and a clip-type fastener securing said webbing-strip end to the tubing, said clip having general T-configuration in at least front elevation and including an elongated bar-like head part having length corresponding substantially to the width of the webbing-strip end and an integral leg part consisting of a shank comprising an area which is blanked out from a longitudinally central, side edge portion of the head part and depends substantially at a right angle to said head part and an arrowhead-shaped point extending in continuation of said shank and having laterally extending locking barbs, said leg part lying generally in a plane which is substantially coplanar with that containing the longitudinal center line of the head part, said barbs being displaced from the general plane of the leg part, said leg part penetrating the webbing-strip end and extending into the tubing opening and said webbing-strip end being folded over on itself and about said head part, the barbs of said point initially serving to secure the fastener to the webbing strip end portion when preassembled thereto and, following assembly with the tubing, underlying and lockingly engaging against a portion of the inside surface of the tubing extending along at least one side edge of the tubing opening.

8. Tubular-frame furniture construction substantially as set forth in claim 7, wherein at least the pointed end portion of the leg part is substantially concavo-convex in transverse section whereby said locking barbs are displaced to one side of the general plane of said leg part.

9. Tubular-frame furniture construction substantially as set forth in claim 7, wherein said head part of the clip is provided along its side edge opposite the side edge portion from which the shank of the clip is cut with a plurality of downwardly-acting teeth which bite into the under-folded end of the webbing strip.

10. Tubular-frame furniture construction substantially as set forth in claim 7, wherein the barbs of said point are displaced to one side of the general plane of said leg part and the point of said leg part is provided in its central portion with a struck out louver projecting to the other side of said plane and defining an upwardly facing shoulder spaced from said fastener head part approximately the same distance as said barbs, said shoulder underlying and lockingly engaging against a portion of the inside surface of the tubing extending along the other edge of the tubing opening.

11. For use in tubular frame furniture construction having supporting elements comprising strips of webbing extending between and secured at their end portions to spaced frame parts made of tubing, a webbing strip-to-tubing fastener comprising a clip member including an elongated bar-like head part having length corresponding substantially to the length of the webbing strip to be fastened and an integral prong-like leg part depending from the middle length portion of said head part, said leg part terminating in a generally arrowhead-shaped point rendering said leg part self-piercing with respect to the webbing strip to be secured and having laterally extending locking barbs whose relatively upper edges are substantially colinear and are spaced from the under surface of the head part a distance substantially equaling the wall thickness of the tubing with which the clip is to be used, said leg part lying generally in a plane which extends longitudinally of the fastener head part, and said barbs being displaced from the general plane of said leg part in direction and amount as to render said barb edges capable of initially securing the fastener to the webbing strip when preassembled thereto and upon final assembly to said tubing of snapping under and lockingly engaging against a portion of the inside surface of the tubing which extends along at least one side edge of an opening provided in said tubing for the reception of said leg part.

12. A webbing strip-to-tubing fastener substantially as set forth in claim 11, wherein said locking barbs are displaced to the same side of the general plane of said leg part.

13. A webbing strip-to-tubing fastener substantially as set forth in claim 11, wherein said locking barbs are displaced to the same side of the general plane of said leg part, and said point is provided in its body portion with a struck-out louver which inclines relatively upwardly-sidewardly from the other side of said plane and terminating in a free upper edge spaced substantially the same distance from the under surface of the head part as said barb edges are spaced therefrom, said upper free edge of said louver being adapted to and capable of snapping under and lockingly engaging against a portion of the inside surface of the tubing which extends along the other side edge of said opening.

14. A webbing strip-to-tubing fastener substantially as set forth in claim 11, wherein said prong-like leg part is substantially concavo-convex in transverse section whereby said locking barbs are disposed to the same side of the general plane of said leg part.

15. A webbing strip-to-tubing fastener substantially as set forth in claim 11, wherein at least one longitudinal side edge of said head part is provided with webbing-strip gripping teeth.

16. A webbing strip-to-tubing fastener substantially as set forth in claim 11, wherein the longitudinal side edges of said head part are provided with webbing-strip gripping teeth.

References Cited in the file of this patent

UNITED STATES PATENTS

| | | |
|---|---|---|
| 2,143,603 | Lombard | Jan. 10, 1939 |
| 2,319,058 | Hansman | May 11, 1943 |
| 2,345,325 | Churchill | Mar. 28, 1944 |
| 2,551,970 | Sampson | May 8, 1951 |
| 2,582,579 | Bedford | Jan. 15, 1952 |
| 2,596,940 | Poupitch | May 13, 1952 |
| 2,796,647 | Bedford | June 25, 1957 |
| 2,817,392 | Thomas | Dec. 24, 1957 |
| 2,845,671 | Fisher | Aug. 5, 1958 |
| 2,937,696 | Arnold | May 24, 1960 |

UNITED STATES PATENT OFFICE
CERTIFICATE OF CORRECTION

Patent No. 3,042,113

July 3, 1962.

Hyman Kramer

It is hereby certified that error appears in the above numbered patent requiring correction and that the said Letters Patent should read as corrected below.

Column 5, line 72, and column 7, line 36, for "length", each occurrence, read -- width --.

Signed and sealed this 19th day of March 1963.

(SEAL)
Attest:

ESTON G. JOHNSON
Attesting Officer

DAVID L. LADD
Commissioner of Patents